United States Patent
Gensler, Jr. et al.

(10) Patent No.: US 9,798,494 B2
(45) Date of Patent: *Oct. 24, 2017

(54) PREALLOCATING STORAGE SPACE FOR AN APPLICATION OPERATION IN A SPACE EFFICIENT VOLUME

(71) Applicant: INTERNATIONAL BUSINESS MACHINES CORPORATION, Armonk, NY (US)

(72) Inventors: Robert S. Gensler, Jr., Beavercreek, OH (US); Lisa J. Gundy, Tucson, AZ (US); Christopher J. Miller, Tucson, AZ (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/610,714

(22) Filed: Jan. 30, 2015

(65) Prior Publication Data
US 2016/0224278 A1    Aug. 4, 2016

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 7,574,560 B2    8/2009    MacHardy et al.
7,971,025 B2    6/2011    Murase et al.
(Continued)

FOREIGN PATENT DOCUMENTS

EP    1 837 751    9/2007

OTHER PUBLICATIONS

DFSMS Advanced Copy Services Version 2 Release 1 of z/OS, IBM, Document SC23-6847-00, 1994, pp. 830.
(Continued)

*Primary Examiner* — Yaima Rigol
(74) *Attorney, Agent, or Firm* — David W. Victor; Konrad Raynes Davda & Victor LLP (57) ABSTRACT

Provided are a computer program product, system, and method for pre-allocating storage space for an application operation in a space efficient volume. To transmit application requests to a storage controller managing a space efficient volume, a determination is made of an amount of space required for an application operation requiring a series of write operations over a period of time to the space efficient volume. A space pre-allocation request for the application operation is transmitted to the storage controller. The space pre-allocation request indicates a requested amount of physical space to pre-allocate to the application operation to cause the storage controller to pre-allocate the requested amount of space in advance of the application operation needing the requested amount of space in the volume for the series of write operations.

12 Claims, 5 Drawing Sheets

(52) U.S. Cl.
CPC .......... *G06F 3/0608* (2013.01); *G06F 3/0631* (2013.01); *G06F 3/0673* (2013.01)

(56) References Cited

U.S. PATENT DOCUMENTS

| | | | | |
|---|---|---|---|---|
| 8,001,085 | B1* | 8/2011 | Kiselev | G06F 11/2071 707/639 |
| 8,108,640 | B1* | 1/2012 | Holl, II | G06F 11/1458 711/162 |
| 8,127,096 | B1* | 2/2012 | Chatterjee | G06F 3/0608 711/162 |
| 8,572,338 | B1* | 10/2013 | Marathe | G06F 3/0608 711/162 |
| 8,656,096 | B2 | 2/2014 | Acedo et al. | |
| 8,667,180 | B2 | 3/2014 | Benhase et al. | |
| 9,176,677 | B1* | 11/2015 | Fradkin | G06F 3/0644 |
| 2005/0138312 | A1* | 6/2005 | Kubo | G06F 11/1466 711/162 |
| 2007/0233992 | A1 | 10/2007 | Sato | |
| 2008/0005468 | A1* | 1/2008 | Faibish | G06F 3/0622 711/114 |
| 2008/0229045 | A1* | 9/2008 | Qi | G06F 3/0605 711/170 |
| 2009/0083502 | A1 | 3/2009 | Horiuchi et al. | |
| 2011/0153977 | A1* | 6/2011 | Root | G06F 12/0223 711/171 |
| 2013/0080704 | A1* | 3/2013 | Brown | G06F 3/0608 711/118 |
| 2013/0097399 | A1 | 4/2013 | Chhaunker et al. | |
| 2013/0205109 | A1 | 8/2013 | Benhase et al. | |
| 2014/0156956 | A1* | 6/2014 | Ezra | G06F 3/065 711/162 |
| 2014/0258657 | A1* | 9/2014 | Schott | G06F 3/0608 711/162 |

OTHER PUBLICATIONS

C. Burger, et al., "IBM System Storage DS8000 Series: IBM FlashCopy SE", IBM, Redpaper, Feb. 2008, Document REDP-4368-00, pp. 80.

T. Makatos, et al., "Using Transparent Compression to Improve SSD-based I/O Caches", ACM, 2010, pp. 14.

U.S. Appl. No. Unknown, filed Jan. 30, 2015, entitled "Preallocating Storage Space for an Application Operation in a Space Efficient Volume".

List of IBM Patents or Patent Applications Treated as Related, Total 2 pp., Jan. 30, 2015.

Office Action dated May 16, 2016, pp. 27, for U.S. Appl. No. 14/610,738, filed Jan. 30, 2015.

Response dated Aug. 16, 2016, pp. 12, to Office Action dated May 16, 2016, pp. 27, for U.S. Appl. No. 14/610,738, filed Jan. 30, 2015.

Final Office Action dated Oct. 7, 2016, pp. 23, for U.S. Appl. No. 14/610,738, filed Jan. 30, 2015.

Response dated Dec. 26, 2016, pp. 13, to Final Office Action dated OCt. 7, 2016, pp. 23, for U.S. Appl. No. 14/610,738, filed Jan. 30, 2015.

Notice of Allowance dated Jun. 14, 2017, p. 13, for U.S. Appl. No. 14/610,738, filed Jan. 30, 2015.

Response dated May 15, 2017, p. 8, to Office Action dated Feb. 14, 2017, p. 20, for U.S. Appl. No. 14/610,738, filed Jan. 30, 2015.

* cited by examiner

FIG. 1

Copy Relationship

FIG. 2

Repository

FIG. 3

PiT Copy Establish Request

PREALLOCATING STORAGE SPACE FOR AN APPLICATION OPERATION IN A SPACE EFFICIENT VOLUME

BACKGROUND OF THE INVENTION

1. Field of the Invention

The present invention relates to a computer program product, system, and method for pre-allocating storage space for an application operation in a space efficient volume.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

In a space efficient volume, volumes are thinly provisioned which means that physical storage space is not allocated to the volumes until a write to the volumes requires the space. The amount of space that is allocated is based on the amount of data that is written to the volume. In space efficient volumes, the device capacity for the devices assigned to the repository pool exceeds the physical addresses allocated to the volumes.

In space efficient volumes, when a point-in-time copy operation is performed, physical storage space is allocated only when a write operation is performed as part of the copying of the point-in-time data from the source storage to the target storage so that data is allocated to the target storage when needed for a specific transfer that is occurring.

SUMMARY

Provided are a computer program product, system, and method for pre-allocating storage space for an application operation in a space efficient volume. To transmit application requests to a storage controller managing a space efficient volume, a determination is made of an amount of space required for an application operation requiring a series of write operations over a period of time to the space efficient volume. A space pre-allocation request for the application operation is transmitted to the storage controller. The space pre-allocation request indicates a requested amount of physical space to pre-allocate to the application operation to cause the storage controller to pre-allocate the requested amount of space in advance of the application operation needing the requested amount of space in the volume for the series of write operations.

DETAILED DESCRIPTION

With prior art space efficient volumes, storage is not allocated to an application until a write occurs. For a copy operation that involves numerous write operations over an extended period of time to copy or move the data, storage space may not be available when needed for the data being transferred as part of the copy operation, such as a point-in-time copy operation. This could result in a failure of the point-in-time copy operation and a loss of the data as of the point-in-time copy if there is not enough physical space for the data being transferred. Furthermore, if the original source data no longer exists, such as if there is a source volume initialization, explicit deletes, hardware errors, etc., then there may be data integrity problems or the loss of the point-in-time copy.

With described embodiments, a determination is made of an amount of space required for an application operation requiring a series of write operations over a period of time to the space efficient volume. A space pre-allocation request for the application operation to the storage controller is generated. The space pre-allocation request causes the storage controller to pre-allocate the requested amount of space in advance of the application operation, which may involve a series of write operations.

Described embodiments provide techniques for pre-allocating storage space to an application operation that will involve a series of write operations over a period of time, such as a point-in-time copy operation where the data is copied over in the background. By pre-allocating space in the space efficient volume before the space is actually needed, it is guaranteed that there will be storage space available for the application operations when the write operation later occurs to allow the application operation to successfully complete.

Figure 1:
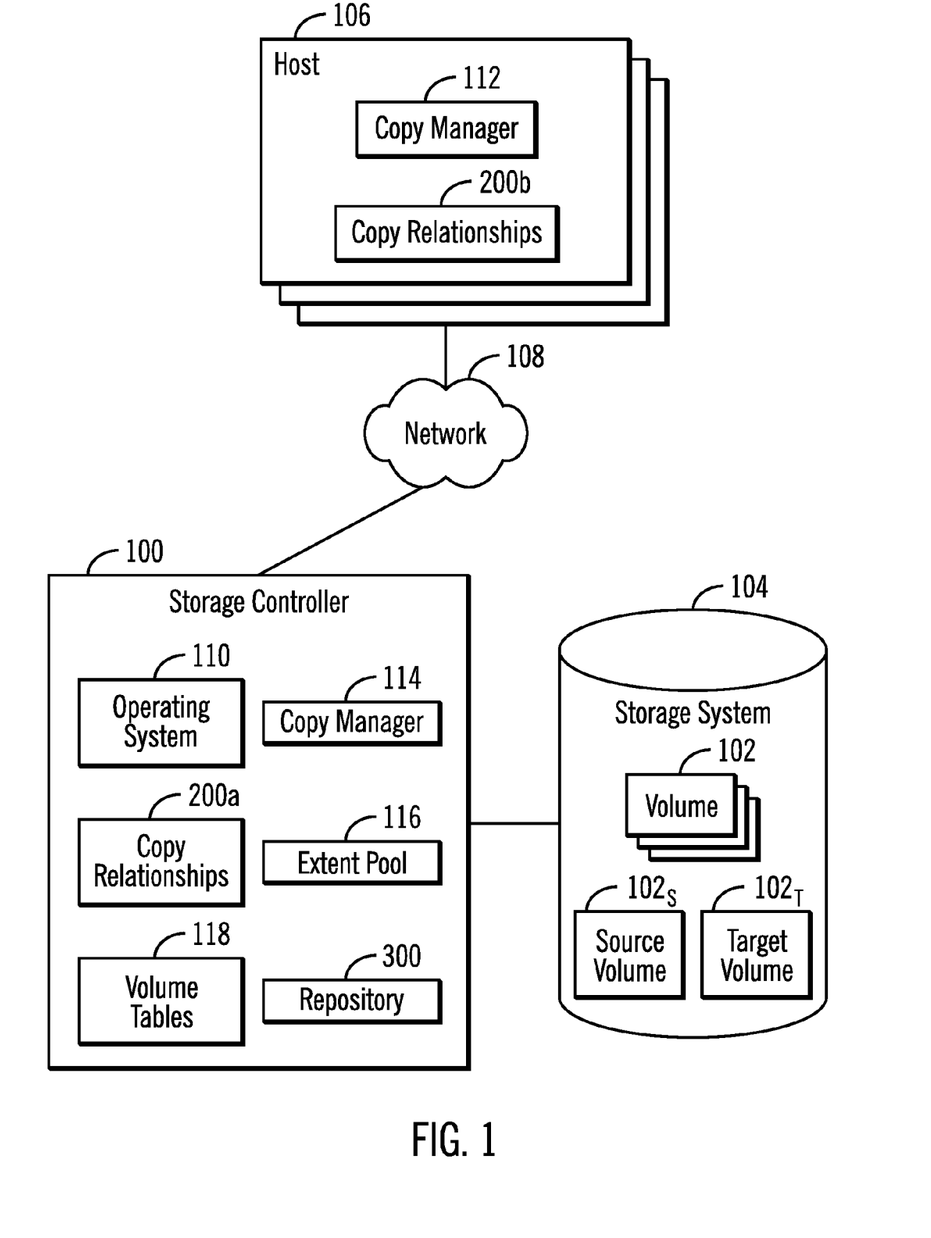
FIG. 1 illustrates an embodiment of a storage environment.

FIG. 1 illustrates an embodiment of a data storage environment having a storage controller 100 managing access to volumes 102 configured in a storage system 104. Host systems 106 perform read and write operations with respect to the volumes 102 over a network 108. The storage controller 100 includes an operating system 110 to manage I/O requests from the host systems 106 with respect to the volumes 102. The operating system 110 may configure the source data 104 in one or more volumes 102 where data is stored in data units, such as tracks, logical block addresses (LBAs), extents, etc. An extent comprises a grouping of tracks, blocks or other data units that is assigned to volumes 102.

The storage system 104 may store tracks in a Redundant Array of Independent Disks (RAID) configuration where strides of tracks are written across multiple storage devices comprising the storages. The storage system 104 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc.

The network 108 may comprise a network such as one or more interconnected Local Area Networks (LAN), Storage Area Networks (SAN), Wide Area Network (WAN), peer-to-peer network, wireless network, etc.

The host 106 includes a copy manager program 112 to generate requests to create point-in-time copies of source volumes $102_S$ to Target Volumes $102_T$ in the Volumes 102 by submitting a point-in-time copy establish request to a copy manager 114 of the storage controller 100. The point-in-time copies are defined in copy relationships 200a, 200b maintained in the host 106 and storage controllers 100.

The storage controller 100 includes a point-in-time copy manager 114 to create point-in-time copies of the source data $102_S$, e.g., FlashCopy, snapshot, etc., in response to PiT copy establish requests from the host system 106 copy manager 112 When creating a PiT copy, the storage controller copy manager 114 generates PiT copy information in the copy relationships 200a on the PiT copy created as of a point-in-time.

The storage controller copy manager 114 performs a PiT copy operation that replicates data in a manner that appears instantaneous and allows processes to continue accessing the source volume $102_S$ while actual data transfers to the copy volume are deferred to a later time. The point-in-time copy appears instantaneous because the storage controller copy manager 114 returns I/O complete to the host PiT copy establish request in response to generating the relationship data structures without copying the data.

In certain embodiments, the storage controller operating system 110 manages volumes 102 as space efficient volumes, where the volumes 102 are configured without allocating actual storage space in the storage system 104 until the space is needed for data written to the volumes 102. In this way the volumes are "thin provisioned" because space is not allocated until needed for write data. The volumes 102 are initially virtual volumes because space in the storage system 104 has not yet been allocated.

The operating system 110 maintains an extent pool 116 of free extents of tracks available to assign to the volumes 102 when space is needed. A repository 300 for the extent pool provides information on the configured 102 volumes, including the logical or virtual space defined for the volumes 102 when they are created as well as the actual physical space in the storage system 104 allocated to the volumes 102.

The operating system 110 further maintains volume tables 118 providing information on the configured volumes 102, including a mapping of logical to physical addresses. When a space efficient volume 102 is first provisioned, all the logical addresses are defined in the volume table 118, but the mapping of physical storage space in the storage system 104 to the logical addresses is not yet provisioned until a write occurs to the logical addresses.

Figure 2:
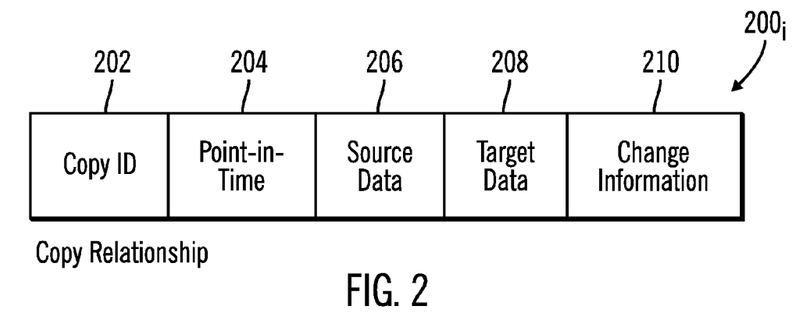
FIG. 2 illustrates an embodiment of a copy relationship.

FIG. 2 illustrates an instance of a copy relationship 200, which may be included in the storage controller 200a and host 200b copy relationships. A PiT copy relationship instance 200, may include a PiT copy identifier 202 identifying the PiT copy created by the copy manager 114 at the storage controller 100; a point-in-time 204 of the PiT copy 202, which may mean that data is consistent as of that point-in-time 204; source data 206, e.g., $102_S$ from which data is copied; target data 208, e.g., $102_T$, to which the PiT data is copied; and change information 210 indicating which data or tracks in the source data 206 has changed since the point-in-time 204 and while the PiT copy 202 was open. The change information 210 may comprise a bitmap having a bit for each data unit (e.g., track) that is set to one of two values indicating the data or track represented by the bit has or has not been updated since the point-in-time 204. The source 206 and target 208 data may comprise a volume, a subset of a volume or other unit of data.

Figure 3:
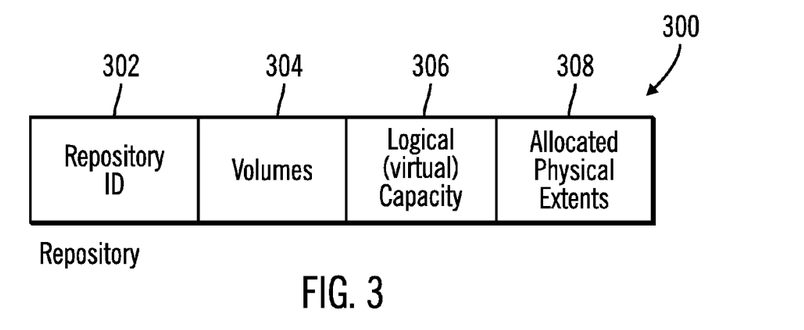
FIG. 3 illustrates an embodiment of a repository.

FIG. 3 illustrates an embodiment of the repository 300 maintained for an extent pool 116, which includes a repository identifier 302; volumes 304 associated with the repository 300; a logical capacity 306 of logical space configured in the volumes 304; and allocated physical extents 308 allocated to the volumes 304 from the extent pool 116 associated with the repository 300. When allocating extents from the extent pool 116 to volumes 304, the operating system 110 would update the allocated physical extents 308 to indicate the newly allocated extents. Once the requested mount of space is allocated to a space efficient volume 102 associated with a repository 300 and extent pool 200, those allocated extents in extent pool 116 are not available for allocation to other of the space efficient volumes 102 supplying extents to the associated volumes.

Figure 4:
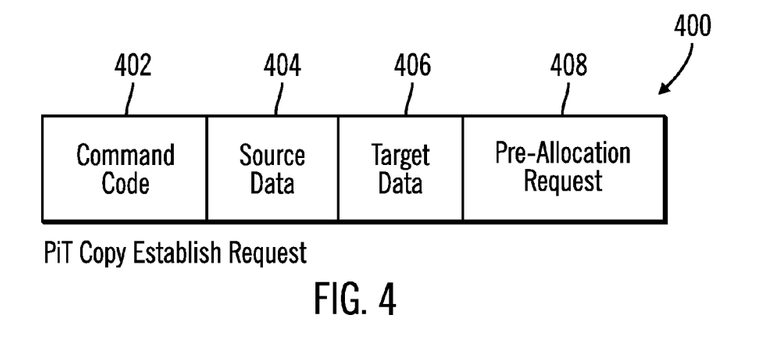
FIG. 4 illustrates an embodiment of a point-in-time copy establish request.

FIG. 4 illustrates an embodiment of a PiT copy establish request 400 generated by the host copy manager 112 to communicate to the storage controller copy manager 114 to create a copy relationship $200_i$. The PiT copy establish request 400 includes a command code 402 to create a PiT copy relationship; source data 404, e.g., volume $102_S$, subject to the PiT copy operation; target data 406, e.g., volume $102_T$, to which the source data 404 is copied; and a pre-allocation request 408 requesting the storage controller 100 to pre-allocate space to the target data 406 that is needed for the source data 404 being copied. The pre-allocation request 408 provisions space from the extent pool 116 for the target volume $102_T$ before the writes actually occur so that the space is available to complete the copying of the PiT source data 404. The source 404 and target 406 data may comprise a volume, a subset of a volume or other unit of data.

Figure 5:
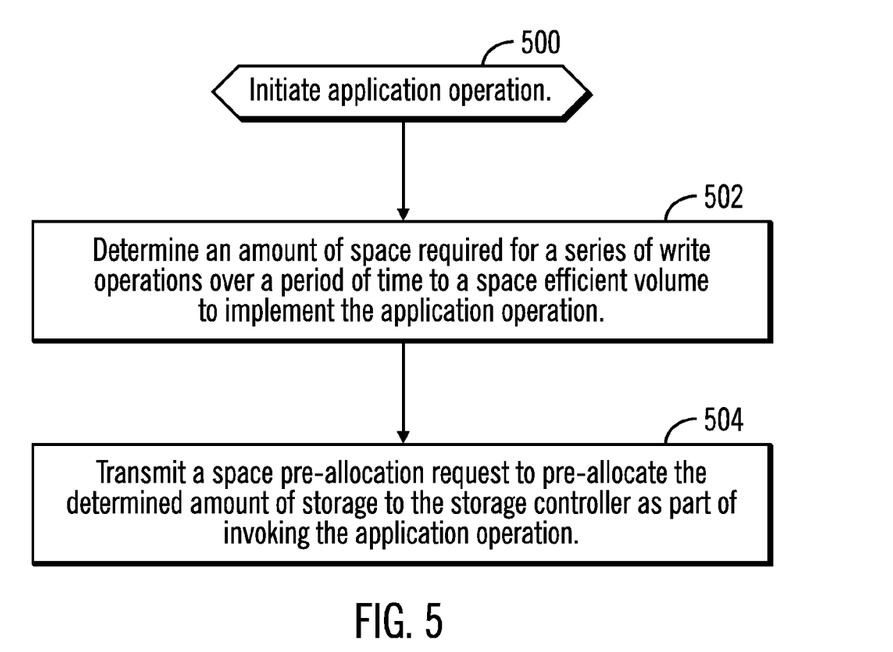
FIG. 5 illustrates an embodiment of operations to initiate an application operation with a space pre-allocation request.

FIG. 5 illustrates an embodiment of operations performed by a software or hardware component in the host 106, such as the PiT copy manager 112, to initiate an application operation that will involve a series of write operations over a period of time, such as, but not limited to, a PiT copy operation. Upon initiating (at block 500) the application operation, the host 106 determines (at block 502) an amount of space required for a series of write operations over a period of time to a space efficient volume to implement the application operation. The determined amount of space may indicate a number of extents, tracks or other data units to pre-allocate. The host 106 transmits (at block 504) a space pre-allocation request to pre-allocate the determined amount of storage to the storage controller 100 as part of invoking the application operation. This space pre-allocation request may indicate a number of extents that will be needed for a series of write operations to be performed by the application operation over a period of time.

In one embodiment, the application operation may comprise a PiT copy operation initiated by the host copy manager 112 in the form of a PiT copy establish request 400. In the embodiment of FIG. 4, the host copy manager 112 indicates in the pre-allocation request 408 field the determined amount of space to pre-allocate. In this way, the pre-allocation request is included in the command invoking the application operation. In an alternative embodiment, the pre-allocation request may be implemented in a separate command from the application operation command, e.g., 400, that is transmitted with the application operation command to the storage controller 100.

Figure 6:
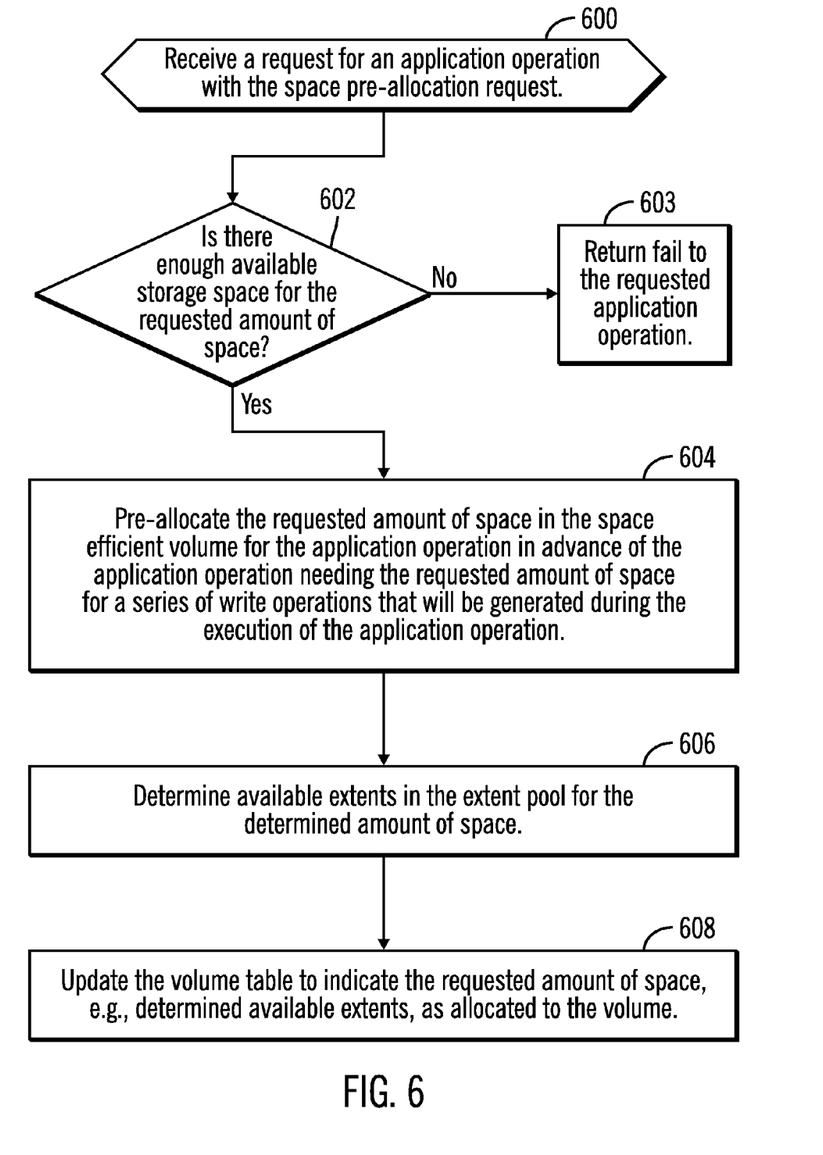
FIG. 6 illustrates an embodiment of operations to process an application operation with a space pre-allocation request.

FIG. 6 illustrates an embodiment of operations performed by a software or hardware component in the storage controller 100, such as the operating system 110, copy manager 114, etc. Upon receiving (at block 600) a request for an application operation with the space pre-allocation request, the storage controller 100 determines (at block 602) whether there is enough available storage space in the storage system 104 to allocate to the pre-allocation request. If not (at block 604), the storage controller 100 may return failure to the application request to the host 100. If there is sufficient space, such as in the extent pool 116, the storage controller 100 pre-allocates (at block 604) the requested amount of space in the space efficient volume 102 for the application operation in advance of the application operation needing the requested amount of space for a series of write operations that will be generated during the execution of the application operation. In one embodiment, space may be pre-allocated by determining (at block 606) available extents in the extent pool 116 for the determined amount of space and then updating (at block 608) the volume table 118 for the volume for which the pre-allocation request is directed, e.g., $102_T$, to indicate the requested amount of space, e.g., determined available extents, as allocated to the volume, e.g., $102_T$. The operating system 110 may further update the repository 300 to increase the allocated physical extent 308 by the extents that are added to the volume.

In one embodiment, the requested application operation may comprise a PiT copy establish request 400 that includes the pre-allocation request 408 within the command 400. In such case, the pre-allocation request would request space be allocated to the target volume $102_T$ to which the source data $102_S$ is to be copied.

In alternative embodiments, the pre-allocation request may be for an application operation other than a PiT copy operation, such as an operation to move data, or an operation involving a plurality of write operations over an extended time, where the write operations may be for asynchronous, synchronous or other types of write operations.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
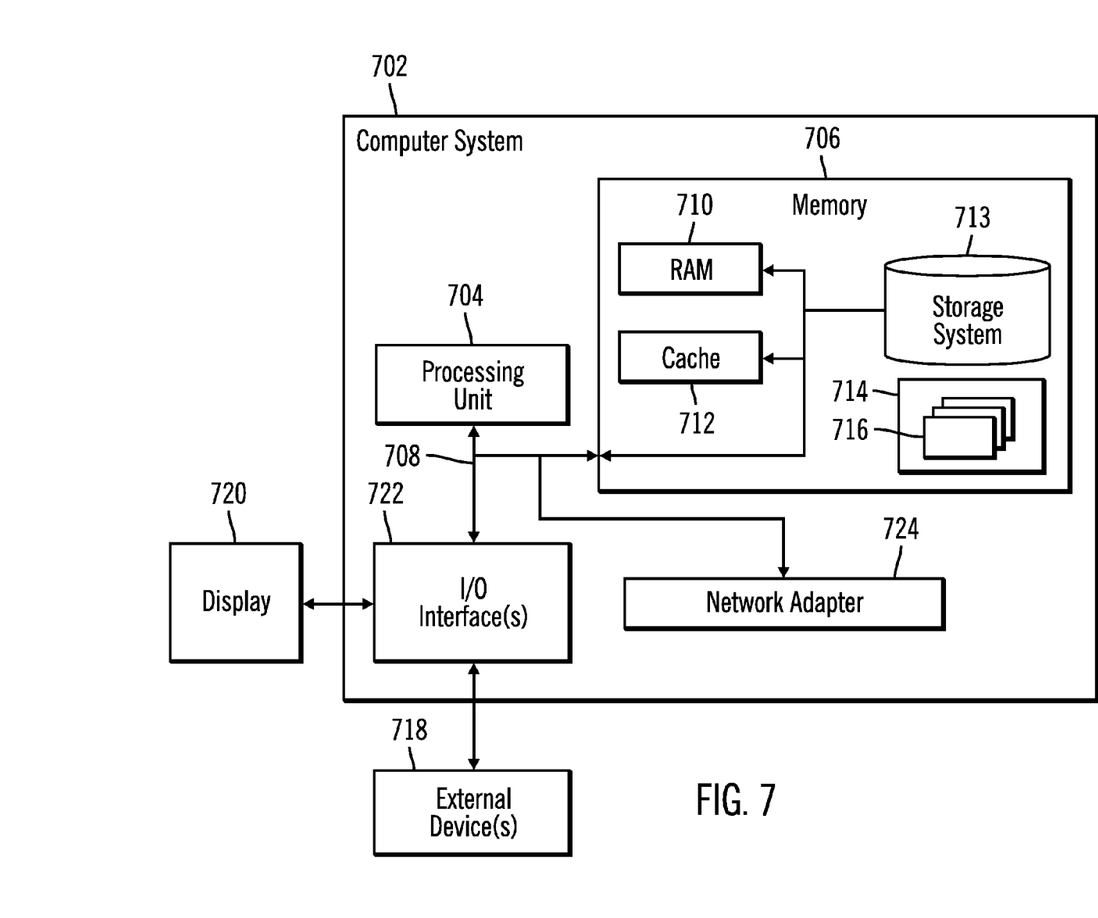
FIG. 7 illustrates a computing environment in which the components of FIG. 1 may be implemented.

The computational components of FIG. 1, including the storage controller 100 and host 106 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product deployed in a host system for transmitting application requests to a storage controller managing a space efficient volume in a storage system, wherein the host system is in communication with the storage controller, wherein the computer program product comprises a computer readable storage medium having program instructions embodied therewith, the program instructions executable by a processor in the host system to cause operations, the operations comprising:

determining an amount of space to pre-allocate for a point-in-time copy relationship to establish to copy source data to target data, wherein the amount of space to pre-allocate is for the target data in the space efficient volume;

generating a point-in-time copy establish request to create the point-in-time copy relationship from the source data to the target data and a space pre-allocation request indicating the determined amount of space to pre-allocate to the target data that is needed for the source data to copy, wherein the space pre-allocation request is indicated in the point-in-time copy establish request; and transmitting the point-in-time copy establish request and the space pre-allocation request for the target data, from the host system to the storage controller to cause the storage controller to pre-allocate the determined amount of space in the space efficient volume for the target data to which the source data is copied for the point-in-time copy relationship created by the point-in-time copy establish request.

2. The computer program product of claim 1, wherein the determining the amount of space to pre-allocate comprises:

determining a number of extents in the target data to which the source data is copied, wherein the determined amount of space comprises the determined number of extents.

3. The computer program product of claim 1, wherein the point-in-time copy establish request indicates a background copy operation to copy the source data in a source storage to the target data in a target storage in the storage system, and wherein the determined amount of space to pre-allocate comprises an amount of space in the target storage needed for all data in the source storage subject to the point-in-time copy relationship.

4. The computer program product of claim 1, wherein the storage controller allocates the space efficient volume to the target data, wherein the storage controller does not allocate physical storage space in the space efficient volume to the host system until receiving a write request from the host system and only allocates the determined amount of space needed for the target data, wherein in response to the space pre-allocation request, the storage controller pre-allocates the determined amount of space in the space efficient volume before copying the source data to the target data.

5. A system for transmitting application requests executing in the system to a storage controller managing a space efficient volume in a storage system, wherein the system is in communication with the storage controller, comprising:

a processor; and a computer readable storage medium having program instructions that when executed by the processor performs operations, the operations comprising:

determining an amount of space to pre-allocate for a point-in-time copy relationship to establish to copy source data to target data, wherein the amount of space to pre-allocate is for the target data in the space efficient volume;

generating a point-in-time copy establish request to create the point-in-time copy relationship from the source data to the target data and a space pre-allocation request indicating the determined amount of space to pre-allocate to the target data that is needed for the source data to copy, wherein the space pre-allocation request is indicated in the point-in-time copy establish request; and transmitting the point-in-time copy establish request and the space pre-allocation request for the target data from the system to the storage controller to cause the storage controller to pre-allocate the determined amount of space in the space efficient volume for the target data to which the source data is copied for the point-in-time copy relationship created by the point-in-time copy establish request.

6. The system of claim 5, wherein the determining the amount of space to pre-allocate comprises:

determining a number of extents in the target data to which the source data is copied, wherein the determined amount of space comprises the determined number of extents.

7. The system of claim 5, wherein the point-in-time copy establish request indicates a background copy operation to copy the source data in a source storage to the target data in a target storage, and wherein the determined amount of space comprises an amount of space in the target storage needed for all data in the source storage subject to the point-in-time copy relationship.

8. The system of claim 5, wherein the storage controller allocates the space efficient volume to the target data, wherein the storage controller does not allocate physical storage space in the space efficient volume to the system until receiving a write request from the system and only allocates the determined amount of space needed for the target data, wherein in response to the space pre-allocation request, the storage controller pre-allocates the determined amount of space in the space efficient volume before copying the source data to the target data.

9. A method implemented in a host system for transmitting application requests to a storage controller managing a space efficient volume in a storage system, wherein the host system is in communication with the storage controller, comprising:

determining an amount of space to pre-allocate for a point-in-time copy relationship to establish to copy source data to target data, wherein the amount of space to pre-allocate is for the target data in the space efficient volume;

generating a point-in-time copy establish request to create the point-in-time copy relationship from the source data to the target data and a space pre-allocation request indicating the determined amount of space to pre-allocate to the target data that is needed for the source data to copy, wherein the space pre-allocation request is indicated in the point-in-time copy establish request; and transmitting the point-in-time copy establish request and the space pre-allocation request for the target data from the host system to the storage controller to cause the storage controller to pre-allocate the determined amount of space in the space efficient volume for the target data to which the source data is copied for the point-in-time copy relationship created by the point-in-time copy establish request.

10. The method of claim 9, wherein the determining the amount of space to pre-allocate comprises:

determining a number of extents in the target data to which the source data is copied, wherein the determined amount of space comprises the determined number of extents.

11. The method of claim 9, wherein the point-in-time copy establish request indicates a background copy operation to copy the source data in a source storage to the target data in a target storage in the storage system, and wherein the determined amount of space comprises an amount of space in the target storage needed for all data in the source storage subject to the point-in-time copy relationship.

12. The method of claim 9, wherein the storage controller allocates the space efficient volume to the target data, wherein the storage controller does not allocate physical storage space in the space efficient volume to the host system until receiving a write request from the host system and only allocates the determined amount of space needed for the target data, wherein in response to the space pre-allocation request, the storage controller pre-allocates the determined amount of space in the space efficient volume before copying of the source data to the target data.

* * * * *